US009910798B2

(12) United States Patent
Simionescu et al.

(10) Patent No.: US 9,910,798 B2
(45) Date of Patent: Mar. 6, 2018

(54) STORAGE CONTROLLER CACHE MEMORY OPERATIONS THAT FOREGO REGION LOCKING

(71) Applicant: Avago Technologies General IP (Singapore) Pte. Ltd., Singapore (SG)

(72) Inventors: Horia Cristian Simionescu, Milpitas, CA (US); Timothy E. Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 159 days.

(21) Appl. No.: 14/874,998

(22) Filed: Oct. 5, 2015

(65) Prior Publication Data

US 2017/0097909 A1 Apr. 6, 2017

(51) Int. Cl.
*G06F 13/36* (2006.01)
*G06F 13/28* (2006.01)
(Continued)

(52) U.S. Cl.
CPC ............ *G06F 13/28* (2013.01); *G06F 3/0613* (2013.01); *G06F 3/0647* (2013.01);
(Continued)

(58) Field of Classification Search
CPC .... G06F 13/28; G06F 12/0893; G06F 3/0647; G06F 3/0689; G06F 3/0659; G06F 3/0613; G06F 2212/1016; G06F 2212/60
See application file for complete search history.

(56) References Cited

U.S. PATENT DOCUMENTS

| 6,105,075 A | * | 8/2000 | Ghaffari | ................ G06F 9/3879 710/22 |
| 6,810,448 B1 | * | 10/2004 | Johnson | .................. G06F 13/28 709/216 |

(Continued)

OTHER PUBLICATIONS

"An NVM Express Tutorial" by Kevin Marks, Dell, Inc. Flash Memory Summit 2013 at Santa Clara, CA.*

(Continued)

*Primary Examiner* — Jing-Yih Shyu
(74) *Attorney, Agent, or Firm* — Sheridan Ross P.C.

(57) ABSTRACT

Methods and structure for managing cache memory for a storage controller. One exemplary embodiment a Redundant Array of Independent Disks (RAID) storage controller. The storage controller includes an interface operable to receive Input/Output (I/O) requests from a host, a Direct Memory Access (DMA) module, a memory comprising cache data for a logical volume, and a control unit. The control unit is able to generate Scatter Gather Lists (SGLs) that indicate the location of cache data for incoming read requests. Each SGL is stored in the memory, and at least one SGL points to cache data that is no longer indexed by the cache. The control unit is also able to service an incoming read request based on the SGL, by directing the DMA module to transfer the cache data that is no longer indexed to the host.

20 Claims, 12 Drawing Sheets

(51) Int. Cl.
*G06F 12/0893* (2016.01)
*G06F 3/06* (2006.01)

(52) U.S. Cl.
CPC .......... *G06F 3/0659* (2013.01); *G06F 3/0689* (2013.01); *G06F 12/0893* (2013.01); *G06F 2212/1016* (2013.01); *G06F 2212/60* (2013.01)

(56) References Cited

U.S. PATENT DOCUMENTS

| | | | | |
|---|---|---|---|---|
| 6,912,687 | B1* | 6/2005 | Gates | G06F 11/1076 |
| | | | | 714/6.2 |
| 7,032,228 | B1* | 4/2006 | McGillis | G06F 3/0607 |
| | | | | 709/217 |
| 7,062,501 | B1* | 6/2006 | Young | G06F 13/385 |
| 8,176,252 | B1* | 5/2012 | Alexander | G06F 13/28 |
| | | | | 710/22 |
| 8,271,700 | B1* | 9/2012 | Annem | G06F 13/28 |
| | | | | 710/22 |
| 8,495,301 | B1* | 7/2013 | Alexander | G06F 13/28 |
| | | | | 710/22 |
| 8,635,431 | B2* | 1/2014 | Citron | G06F 9/30043 |
| | | | | 711/118 |
| 8,775,718 | B2* | 7/2014 | Kanevsky | G06F 3/061 |
| | | | | 370/389 |
| 8,806,115 | B1* | 8/2014 | Patel | G06F 11/1471 |
| | | | | 711/103 |
| 2003/0037208 | A1* | 2/2003 | Matthews | G11C 7/1075 |
| | | | | 711/149 |
| 2004/0073622 | A1* | 4/2004 | McDaniel | G06F 13/28 |
| | | | | 709/212 |
| 2014/0012940 | A1* | 1/2014 | Joshi | G06F 9/45558 |
| | | | | 709/214 |
| 2014/0129664 | A1* | 5/2014 | McDaniel | G06F 15/167 |
| | | | | 709/212 |
| 2014/0215103 | A1* | 7/2014 | Cohen | G06F 13/28 |
| | | | | 710/23 |
| 2014/0317333 | A1 | 10/2014 | Dorst et al. | |
| 2014/0337540 | A1* | 11/2014 | Johnson | G06F 13/385 |
| | | | | 710/5 |
| 2015/0339066 | A1* | 11/2015 | Kowles | G06F 3/0619 |
| | | | | 711/103 |
| 2016/0062669 | A1* | 3/2016 | Chu | G06F 3/0611 |
| | | | | 711/103 |

OTHER PUBLICATIONS

"Enterprise NVMHCI Enabling Enterprise Class PCIe SSDs with Unmatched Performance" by Amber Huffman and Peter Onufryk, Aug. 2010.*
"Linux Storage and Virtualization" by Christoph Hellwig, 2010.*
"Research: Scatter/Gather" by Marti A. Hearst, Professor University of California, Berkeley, Jun. 13, 2010, downloaded from http://people.ischool.berkeley.edu/~hearst/research/scattergather.html.*
"The chained scatterlist API" by Jonathan Corbet, Oct. 29, 2007, downloaded from https://lwn.net/Articles/256368/.*
Horia Simionescu, Data Shovel/Killer Bee Lite (PPT2), LSI, Nov. 2013.
Horia Simionescu, Data Shovel/Killer Bee Lite, LSI, Nov. 2013.
Killer Bee Lite—Code, LSI, Nov. 2013.
Shailendra Aulakh et al., Killer Bee Light Architecture Specification, Avago Technologies, pp. 1-149, Jul. 18, 2014.
Shailendra Aulakh et al., Killer Bee Light Architecture Specification, Avago Technologies, pp. 150-251, Jul. 18, 2014.
Xubin He et al., On Design and Implementation of a Large Virtual NVRAM Cache for Software RAID, Department of Electrical and Computing Engineering, University of Rhode Island, Nov. 20, 2001.

* cited by examiner

FIG. 8
ALLOCATE AND POPULATE BUFFER SEGMENTS FOR WRITE COMMAND

FIG. 9
UPDATE CACHE BASED ON WRITE DATA

FIG. 10
CACHE SCAN

FIG. 12

STORAGE CONTROLLER CACHE MEMORY OPERATIONS THAT FOREGO REGION LOCKING

FIELD

The invention relates generally to cache memory, and in particular to cache memory utilized by storage controllers.

BACKGROUND

In many computing systems, a Central Processing Unit (CPU) directs exchanges of data between various devices coupled to a system bus. A CPU is responsible for a large number of tasks, however, and can therefore become overburdened when coordinating a large number of transfers of data. Direct Memory Access (DMA) is a technology that enables a CPU to offload the processing burden caused by memory transfers. Using DMA techniques, a DMA module (independent from the CPU) is capable of exchanging data between memory devices that are coupled to the bus, without involving the CPU.

BRIEF DESCRIPTION OF THE DRAWINGS

Some embodiments of the present invention are now described, by way of example only, and with reference to the accompanying figures. The same reference number represents the same element or the same type of element on all figures.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Systems and methods herein enhance cache memories used for DMA transfers. Specifically, operations directed to the cache memories described herein utilize internal Scatter Gather Lists (SGLs) that are locally maintained in the cache memory itself. The SGLs direct DMA operations for transferring cache data. Furthermore, the SGLs exist independently of indexing data used by the cache. This means that indexing data for the cache may be updated at any time without corrupting existing SGLs that are being used to direct ongoing DMA operations. Because of this feature, region locks are rendered unnecessary and can be foregone for the cache memory. Thus, overlapping host requests do not corrupt or otherwise harm each other, even when they are directed to the same Logical Block Addresses (LBAs) of a logical volume.

Figure 1:
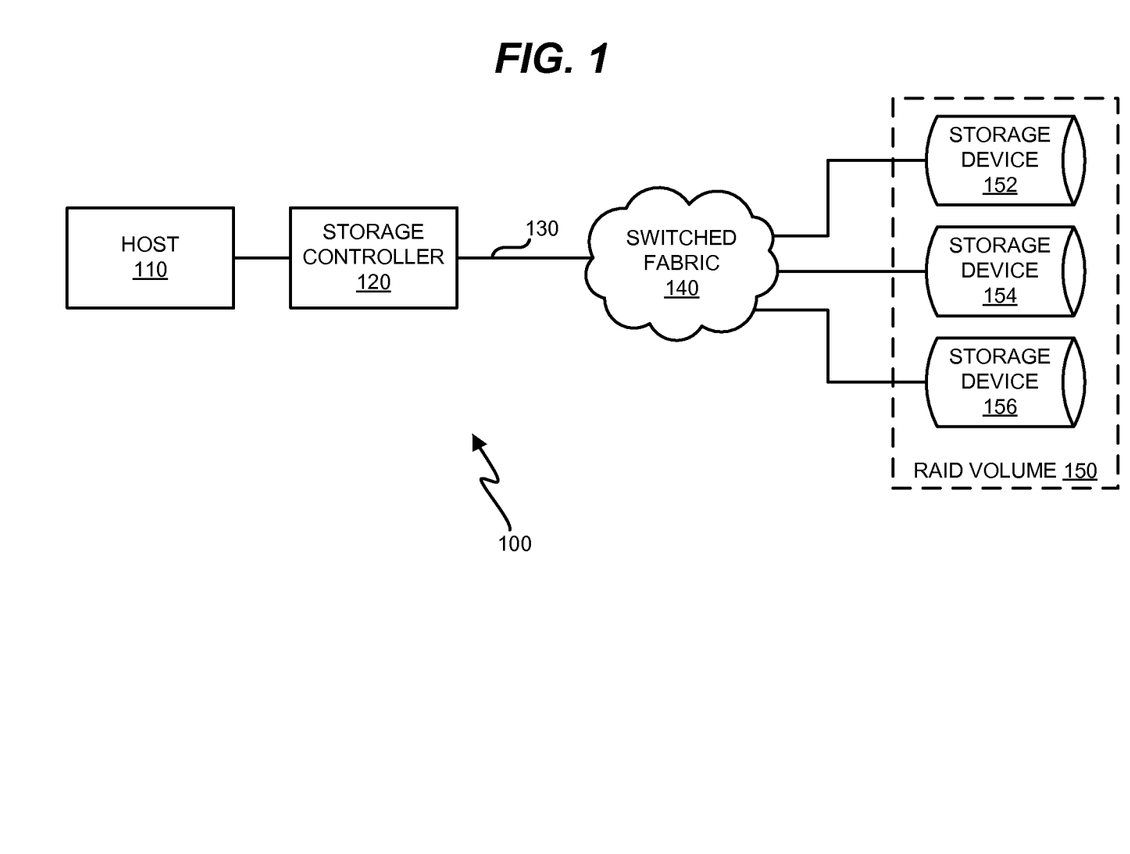
FIG. 1 is a block diagram of an exemplary storage system.

FIG. 1 is a block diagram of an exemplary storage system 100. Storage system 100 stores and retrieves data on behalf of a host 110 in order to facilitate processing operations. In this embodiment, storage system 100 comprises storage controller 120, communication channel 130, switched fabric 140, and storage devices 152-156, which implement Redundant Array of Independent Disks (RAID) volume 150. Storage system 100 provides a benefit over prior systems, because storage controller 120 utilizes caching techniques that eliminate the need for region locks when accessing cached data for host 110. By eliminating the need for region locks while also maintaining data integrity, storage controller 120 increases the speed at which host Input/Output (I/O) requests are processed with cache data.

Host 110 comprises any system capable of performing processing operations upon stored data. Host 110 is communicatively coupled with storage controller 120 via, for example, a Peripheral Component Interconnect Express (PCIe) interface, and provides I/O requests to storage controller 120. Host I/O requests include requests to acquire data from RAID volume 150, as well as requests to modify written data at RAID volume 150. Based on received host requests, storage controller 120 generates and transmits commands to storage devices 152-156 via communication channel 130 and switched fabric 140.

Communication channel 130 comprises, for example, a channel compliant with protocols for SAS, Fibre Channel, Ethernet, etc. Switched fabric 140 comprises any combination of communication channels operable to forward/route communications for storage system 100, for example, according to protocols for one or more of Small Computer System Interface (SCSI), Serial Attached SCSI (SAS), Fibre Channel, Ethernet, Internet SCSI (ISCSI), etc. In one embodiment, switched fabric 140 comprises a combination of SAS expanders that link to one or more targets.

Storage device 152-156 receive commands via switched fabric 140 for retrieving and/or modifying stored data. Storage devices 152-156 implement the persistent storage capacity of storage system 100, and are capable of writing and/or reading data in a computer readable format. Storage devices 152-156 implement storage space for one or more logical volumes such as RAID volume 150. A logical volume comprises allocated storage space and data available at storage system 100. A logical volume can be implemented on any number of storage devices 152-156 as a matter of design choice. Furthermore, the storage devices need not be dedicated to only one logical volume, but can also store data for a number of other logical volumes. Storage devices 152-156 can comprise magnetic hard disks, solid state drives, optical media, etc. compliant with protocols for SAS, Serial Advanced Technology Attachment (SATA), Fibre Channel, etc.

Figure 2:
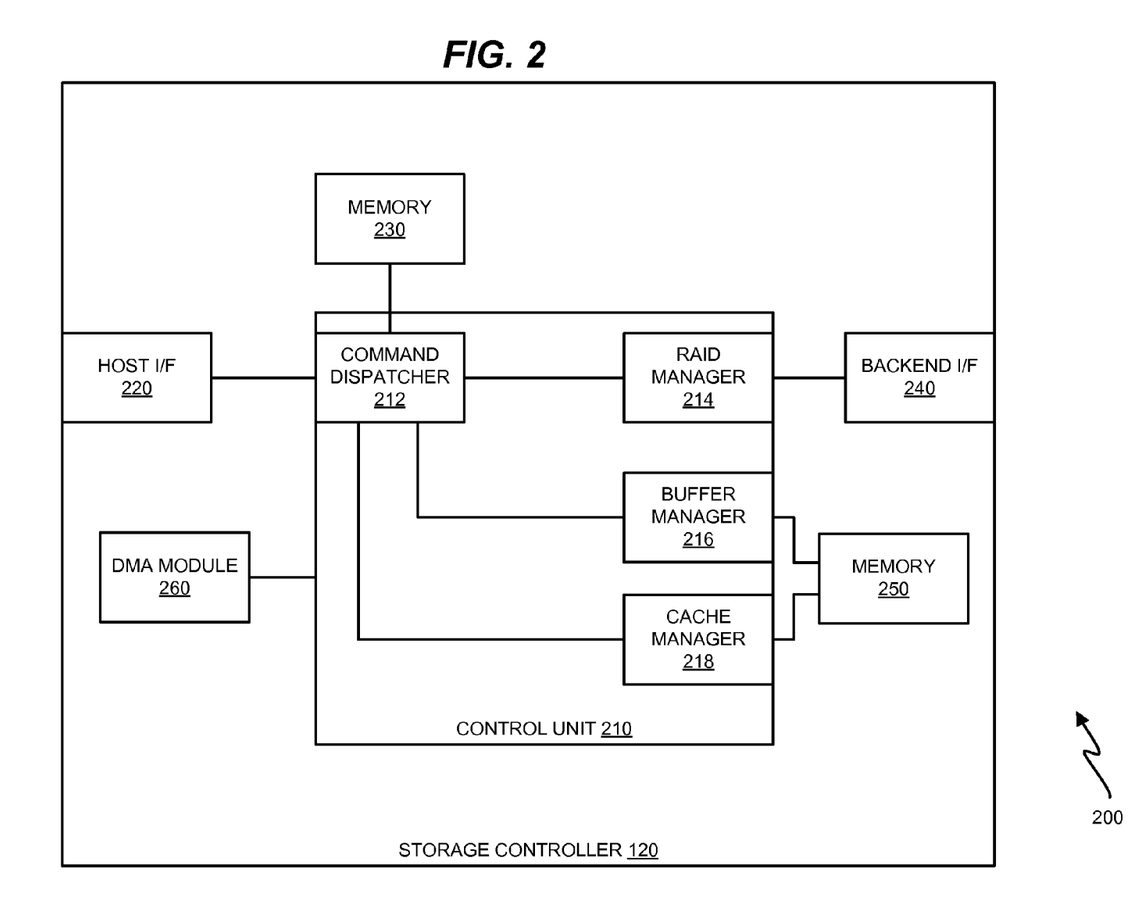
FIG. 2 is a block diagram of an exemplary storage controller.

Further details of storage controller 120 are provided in FIG. 2, which is a block diagram 200 of storage controller 120. According to FIG. 2, storage controller 120 includes control unit 210, which implements a variety of logical elements for managing caching operations. Control unit 210 can be implemented as custom circuitry, a processor executing programmed instructions stored in program memory, or some combination thereof. The logical elements of control unit 210 include command dispatcher 212, which receives commands via host interface (I/F) 220 (e.g., a PCIe interface) for processing, modifies the commands into an internal format, and routes the commands to their appropriate destination. To achieve these goals, command dispatcher 212 may utilize a fast memory 230, such as a Static Random Access Memory (SRAM) which stores tracking information and metadata for host I/O. For example, in one embodiment the SRAM allocates and populates internal I/O frames relating to Logical Memory Identifiers (LMIDs). In a further embodiment the SRAM allocates and downloads Physical Region Page (PRP) lists from host I/O frames. This technique is useful for devices that conform with the Non-Volatile Memory Host Controller Interface Specification (NVMHCI). Such devices are known as NVMe devices.

Command dispatcher 212 sends processed I/O requests to various other logical elements of control unit 210, depending on whether the I/O request is being handled for write-back caching, and depending on whether the I/O request is a write request or a read request. For example, incoming write requests that update data stored in cache memory 250 are sent to buffer manager 216, which allocates buffer segments that store "payload data" for RAID volume 150. As used herein, "payload data" refers to data stored in one or more Logical Block Addresses (LBAs) of RAID volume 150, and does not refer to data used to track or index such LBAs.

Incoming read requests directed to data stored in cache memory 250 are sent to cache manager 218. Incoming write requests are also processed by cache manager 218, after buffer segments have been allocated for those requests. Cache manager 218 manages and updates cache entries, which are used as an indexing mechanism to correlate buffer segments with LBAs on RAID volume 150. Based on the cache entries, cache manager 218 generates Scatter Gather Lists (SGLs) to service incoming requests. Cache manager 218 then uses the SGLs to direct DMA module 260 to facilitate data transfers between cache memory 250 and host 110. If requested read data is not stored in cache memory 250, cache manager 218 contacts RAID manager 214, which utilizes backend interface (I/F) 240 (e.g., a SAS interface) to acquire and/or update the requested data from persistent storage at storage devices 152-156.

Figure 3:
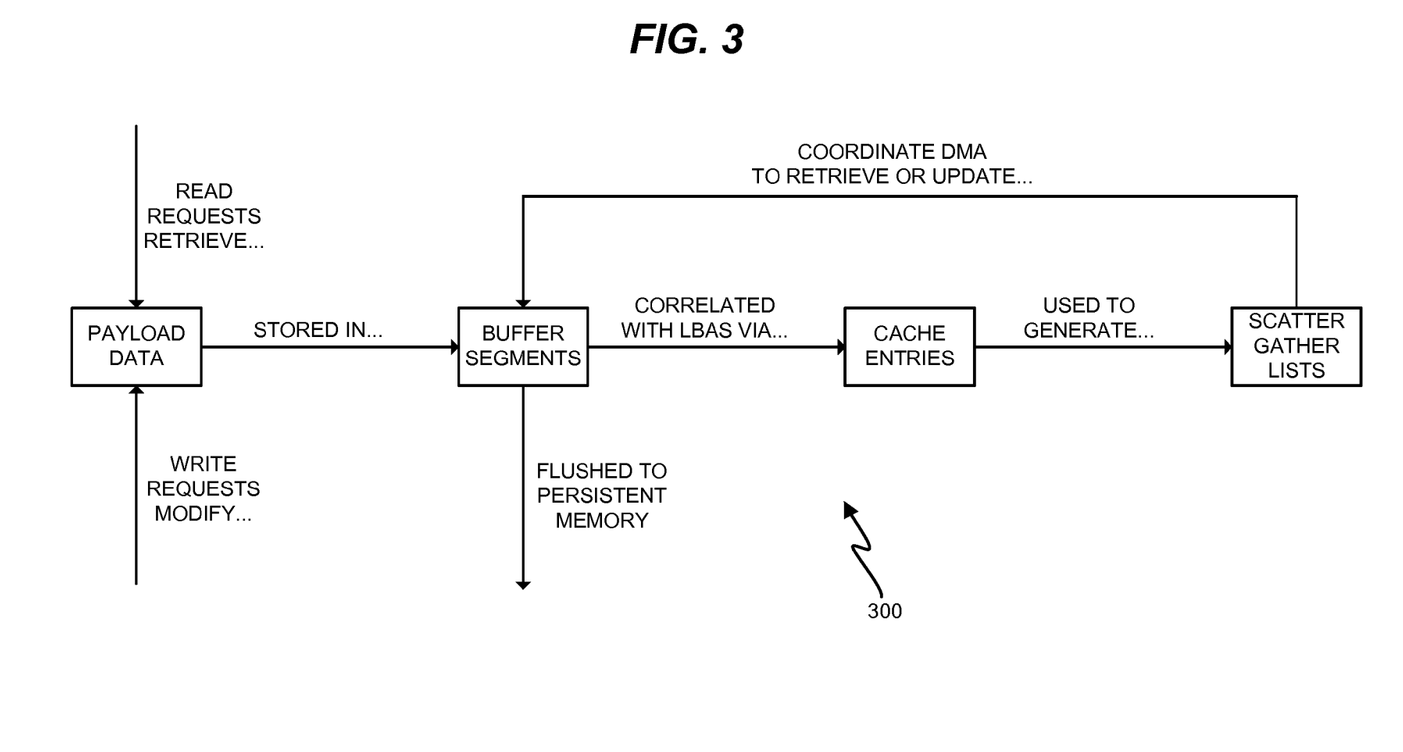
FIG. 3 is a relationship diagram illustrating exemplary data maintained at a storage controller.

FIG. 3 illustrates an exemplary relationship diagram 300 for data stored at a storage controller. Specifically, FIG. 3 illustrates relationships between payload data, buffer segments that store payload data, cache entries that correlate buffer segments with LBAs, and SGLs that coordinate DMA transfers of data to and from buffer segments, based on indexing information found in the cache entries. FIG. 3 indicates that payload data for host requests is stored in buffer segments that are allocated in cache memory 250. Data stored in the buffer segments may be flushed to persistent memory (e.g., storage devices 152-156), or maintained in cache memory 250 as desired. For example, when cache memory 250 operates as a write-back cache, buffer segments storing data for incoming write requests are regularly flushed from cache memory 250 to persistent storage. If buffer segments for a write request have already been flushed to persistent memory, then they are selectively discarded from the cache, based on whether or not a read is being performed upon them. Cache entries indicate which LBAs correspond with which buffer segments, and the cache entries are used as the basis for creating SGLs. The SGLs in turn are used to coordinate DMA operations to transfer data between the cache memory and the host (i.e., either into cache memory or into host memory via a bus).

The particular arrangement, number, and configuration of components described herein is exemplary and non-limiting. While in operation, storage system 100 manages cache memory 250 as a write-back cache in order to quickly process incoming write requests. Storage controller 120 also utilizes data from cache memory 250 to service incoming read requests.

Figure 4:
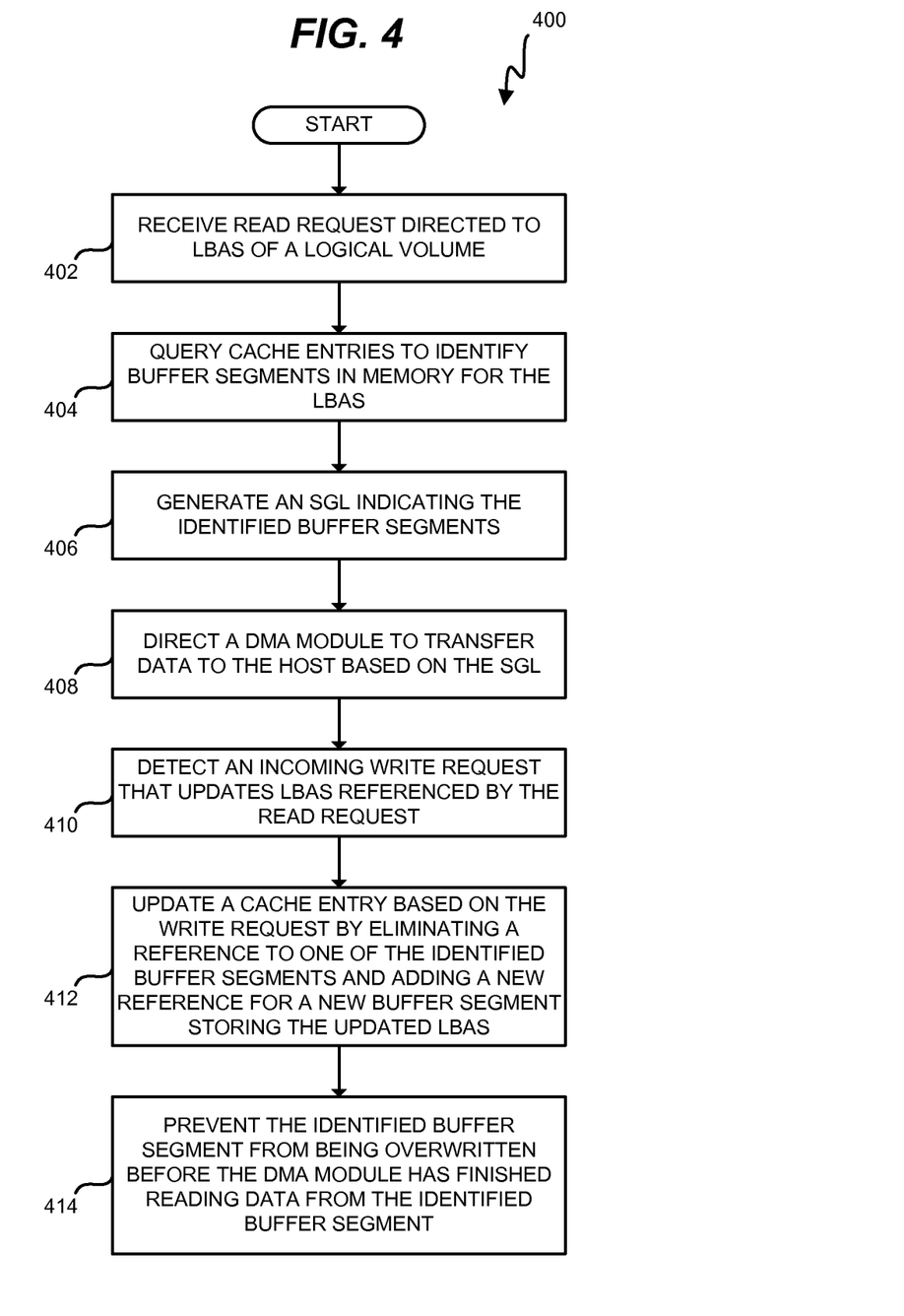
FIG. 4 is a flowchart describing an exemplary method to operate a storage controller.

FIG. 4 is a flowchart 400 describing an exemplary method 400 for cache management at storage controller 120. Method 400 illustrates how cache memory 250 can be operated to service overlapping host requests (e.g., requests that reference at least some of the same LBAs as each other) that would otherwise require region locking in order to preserve data integrity. In step 402, control unit 210 receives a read request from host 110 via host I/F 220. The command dispatcher 212 at control unit 210 analyzes the request, identifies the request as a read request, and determines the LBAs of RAID volume 150 that the read request is directed to. Command dispatcher 212 converts the received request into a new format (e.g., a smaller, internal format that translates requested LBAs into strip and/or stripe numbers), and transmits the revised read request to cache manager 218. In step 404, cache manager 218 queries/consults cache entries in cache memory 250 to identify buffer segments in cache memory 250 that store data for the LBAs indicated by the read request. In one embodiment, this step includes identifying a cache entry for an LBA indicated by the read request, and analyzing the cache entry to identify a list of buffer segments storing relevant data.

In step 406 the cache manager generates an SGL indicating the identified buffer segments. The SGL independently correlates LBAs with buffer segments. In one embodiment, the SGL includes multiple Scatter Gather Entries (SGEs), and each SGE identifies a buffer segment based on an offset of the buffer segment from a known location in cache memory 250. For example, when buffer segments are each 4 kilobytes (kB) in size and the first buffer segment starts at a memory address X, an SGE may indicate the location of a buffer segment by indicating the number Y of the buffer segment, and the buffer segment may be accessed at a memory location according to the formula X+(4 kB)*Y. In one embodiment, the SGL copies directly copies references from a cache entry in order to indicate the identified buffer segments.

The SGL independently stores data that refers to the buffer segments storing data for the read request. That is, once the SGL has been created, future changes to the cache entries/tracking data will not interrupt operations that are based on the SGL, because the SGL refers directly to buffer segments themselves, and not the cache entries. In this manner, the SGL operates as a snapshot of RAID volume 150 at a point in time.

Step 408 comprises cache manager 218 directing DMA module 260 to utilize DMA operations to transfer data from the identified buffer segments to host 110, based on the SGL. In this manner, storage controller 120 starts to transfer data to the host from cache memory 250 via DMA. In one embodiment, this step includes accessing each entry in the SGL to identify a buffer segment, and then utilizing DMA to transfer data to host 110 from the buffer segment. In further embodiments where cache manager 218 generates multiple SGLs to service the read request, the last entry of at least one of the SGLs comprises a "chain" entry that points to a next SGL having more entries for processing.

While the DMA transfer is ongoing, storage controller 120 receives a write request from host 110. In step 410, control unit 210 determines that the incoming write request will update LBAs that are being retrieved for the read request. That is, control unit 210 determines that the write request is directed to at least one LBA that is also referenced by the read request. In this situation, caching techniques that use region locks would delay processing of the write request until the read request was entirely completed (via the DMA transfer). However, storage controller 120 is able to process the write request before the read request has completed, because as discussed above, the SGL for the read request is not invalidated when the incoming write request modifies cache entries.

After the write request has been received, cache memory 250 is updated to reflect the changes to cache data. New buffer segments are allocated by buffer manager 216 to store the updated data provided by the write request. Some of the new buffer segments will store data for the same LBAs as "old" buffer segments that are currently being used to service the read request. Thus, in step 412 cache manager 218 updates cache entries based on the write request so that the cache entries no longer refer to old buffer segments. Specifically, updating the cache entry includes eliminating a reference to an old buffer segment storing outdated data, and adding a new reference to a newly allocated buffer segment. The buffer segment storing the "old" version of the LBA is therefore dereferenced and is no longer referred to by the cache entries, but may still be accessed via the SGL. Any buffer segments that are in use from the previous read are updated into a global Boot Strap (BS) table to update any changes to identifier (ID) and state.

After the cache entry has been updated, in step 414 control unit 210 prevents the identified/old buffer segment from being overwritten before DMA module 260 has finished reading data from the identified/old buffer segment. Thus, even though the old buffer segment is no longer tracked/indexed by cache entries, it is still used to service the read request. The buffer segment can then be deallocated for re-use after DMA operations for the read request have completed.

Even though the steps of method 400 are described with reference to storage system 100 of FIG. 1, method 400 can be performed in any suitable storage controller, regardless of the architecture in which the storage controller is placed. The steps of the flowcharts described herein are not all inclusive and can include other steps not shown. The steps described herein can also be performed in an alternative order.

Using method 400, buffer segments that store old payload data can remain in cache memory 250 in an unindexed state. However, these old buffer segments can still be used to service earlier read requests, because the SGLs used by those read requests refer directly to the old buffer segments, without utilizing the indexing mechanism (i.e., the cache entries) that are normally to track payload data for cache memory 250.

Examples

Figure 5:
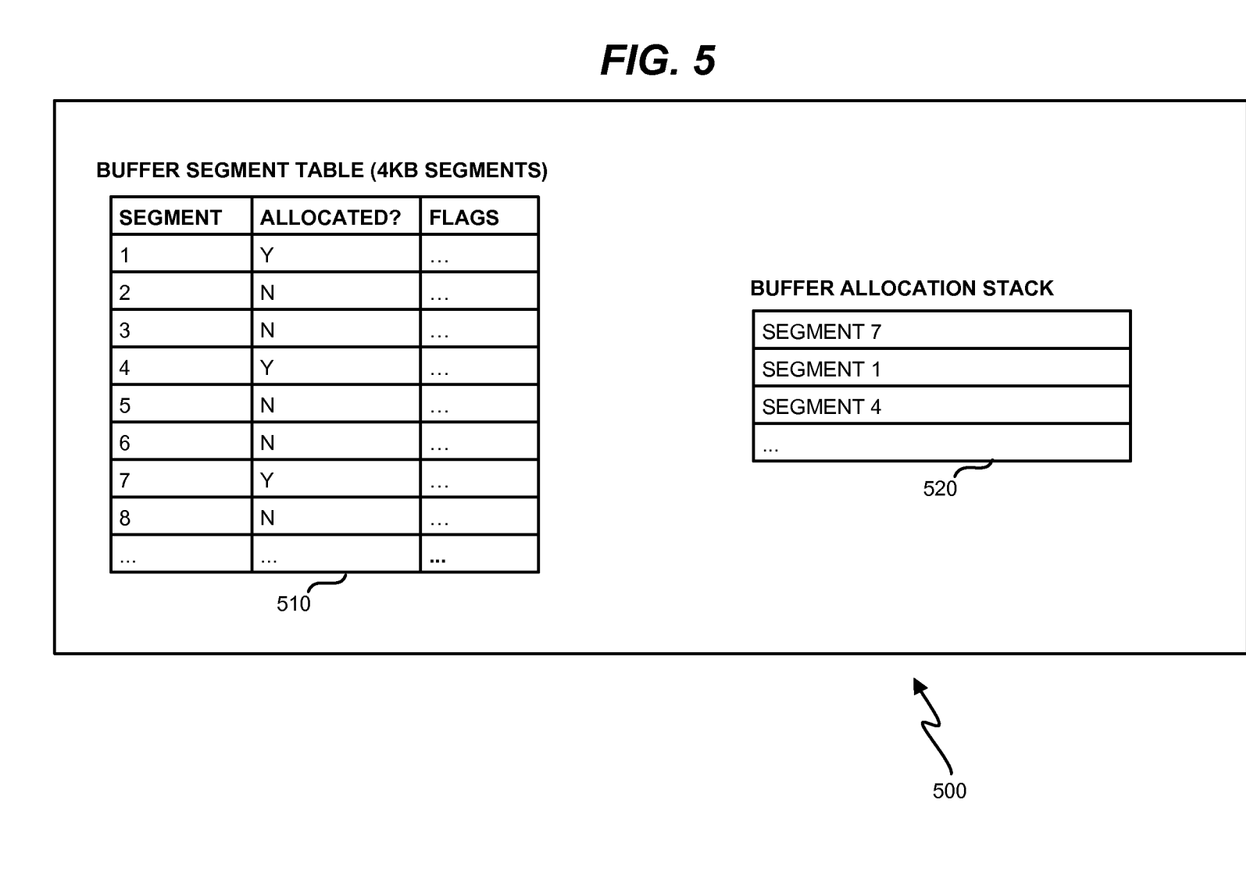
FIG. 5 is a block diagram illustrating exemplary data for a buffer manager of a storage controller.
Figure 6:
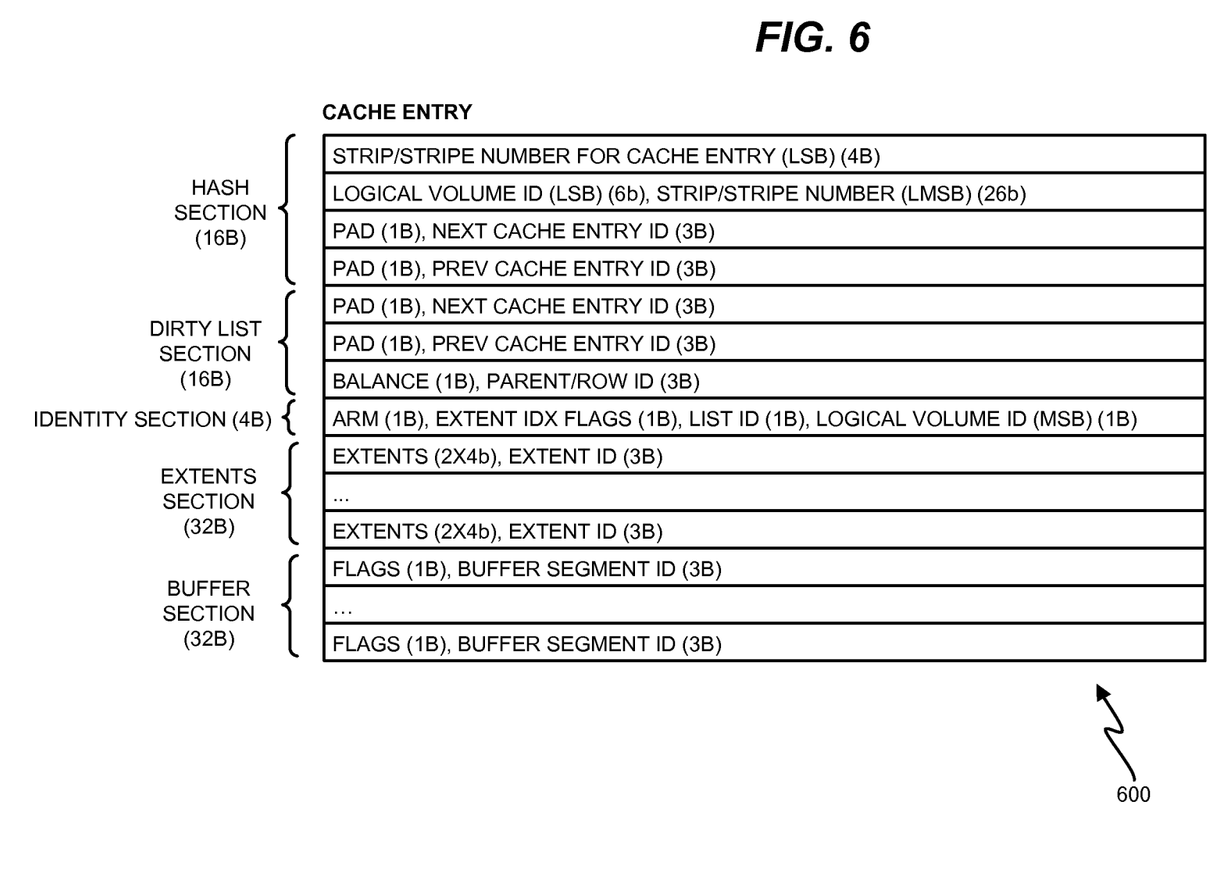
FIG. 6 is a block diagram illustrating an exemplary cache entry.
Figure 7:
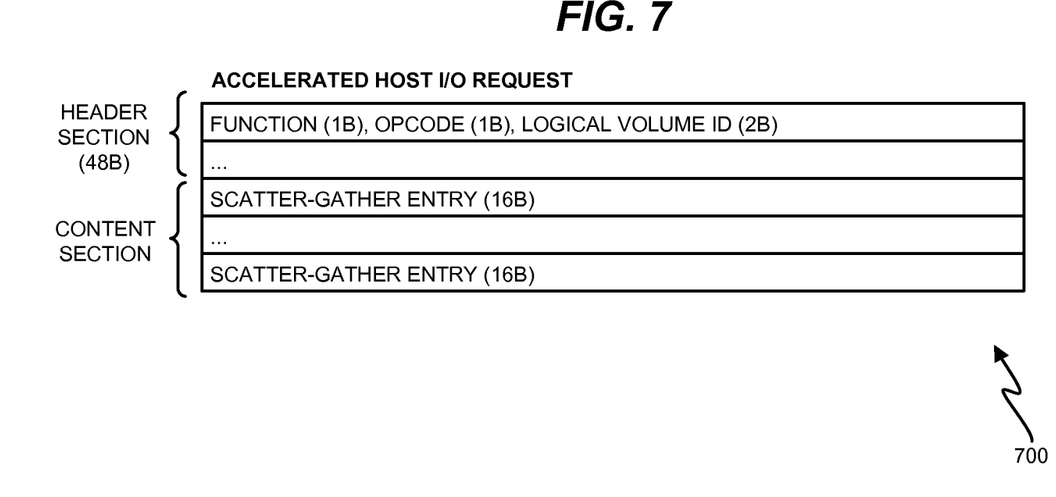
FIG. 7 is a block diagram illustrating an exemplary accelerated host request.

In the following examples, additional processes, systems, and methods are described in the context of caching techniques for a storage controller. FIGS. 5-7 illustrate exemplary data structures, while FIGS. 8-11 illustrate detailed methods of operation.

FIG. 5 illustrates exemplary data 500 stored for buffer segments of a cache memory. This data may be stored in cache memory 250 as metadata by a buffer manager of a storage controller. In this example, a set of buffer segments occupy a contiguous block of memory, and are each referred to by a number indicating an offset from a start address of the contiguous block of memory. Thus, the address of any buffer segment can be determined based on its number. Data 500 includes buffer segment table 510, which indicates, on a segment-by-segment basis, whether or not a buffer segment is allocated for presently storing data. As used herein, a buffer segment is referred to as allocated if it is presently reserved for storing data that should not be overwritten, and is referred to as deallocated or unallocated if it is available for overwriting and re-use to store new data. Buffer segment table 510 also includes a set of flags for each buffer segment, which indicate whether or not the buffer segment is currently flushing. The flags also indicate a count of the number of read requests that are presently utilizing the buffer segment.

FIG. 5 further illustrates buffer allocation stack 520 in cache memory 250. Stack 520 is a data structure comprising a Last In First Out (LIFO) queue that entries are pushed onto and popped off of Each entry on the stack refers to a buffer segment that is presently unallocated. This enables the storage controller to rapidly allocate new buffer segments by pulling free buffer segments from the stack when write requests are received. In one embodiment, the stack is utilized by the CPU of a computer to acquire instructions and other data for processing.

FIG. 6 illustrates an exemplary cache entry 600, which stores data that correlates LBAs with buffer segments in cache memory. Each cache entry includes a hash section, which enables a hash to be generated based on a combination of logical volume identifier and stripe/strip number. The hash section is a combination of logical volume identifier (in Least Significant Bit (LSB) format wherein the LSB is listed first) and strip/stripe number. This data, when hashed, matches an entry in a hash table pointing to the cache entry. The hash section also includes space for a doubly-linked list used to refer to other cache segments that have the same index in the hash table.

Each cache entry also includes a dirty list section, which includes a doubly-linked list to identify other cache entries which are dirty. An identity section of the cache entry includes a RAID arm indicator, as well as a number of flags, a list ID identifying a list that the cache entry belongs to, and a logical volume ID indicating the logical volume that the cache entry refers to. The extents section of the cache entry provides identifiers for extents of the RAID volume covered by the cache entry, and a buffer section of cache entry indicates which buffer segments store data for strips/stripes of the logical volume. The buffer segments are identified by number instead of address in order to save space. Flags accompany each buffer segment ID to indicate whether the buffer segment is dirty, is valid, is clean, is flushing, or is currently being read.

FIG. 7 illustrates an exemplary accelerated host I/O request 700 generated to service a DMA operation. In this example, the request 700 includes a header section as well as a content section. The header section includes data from the original read request received from the host, such as a function performed by the request (e.g., read vs. write), an opcode, and an ID for the logical volume that the request relates to. The header may include further information such as a logical arm that the request is directed to, a logical identifier known as a Logical Drive ID (LD ID), a virtual function identifier, sense buffer low addresses, an offset, a sense length, a number of blocks, end-to-end data protection (EEDP) data, etc. The content section includes an SGL with numerous SGEs. Each SGE includes information copied from a buffer section of a cache entry, and points directly to a buffer segment stored in cache memory. That is, SGEs include data indicating the buffer addresses as stored in the host memory. Each SGE therefore enables a DMA module to access a buffer segment, even if that buffer segment is no longer indexed.

Figure 8:
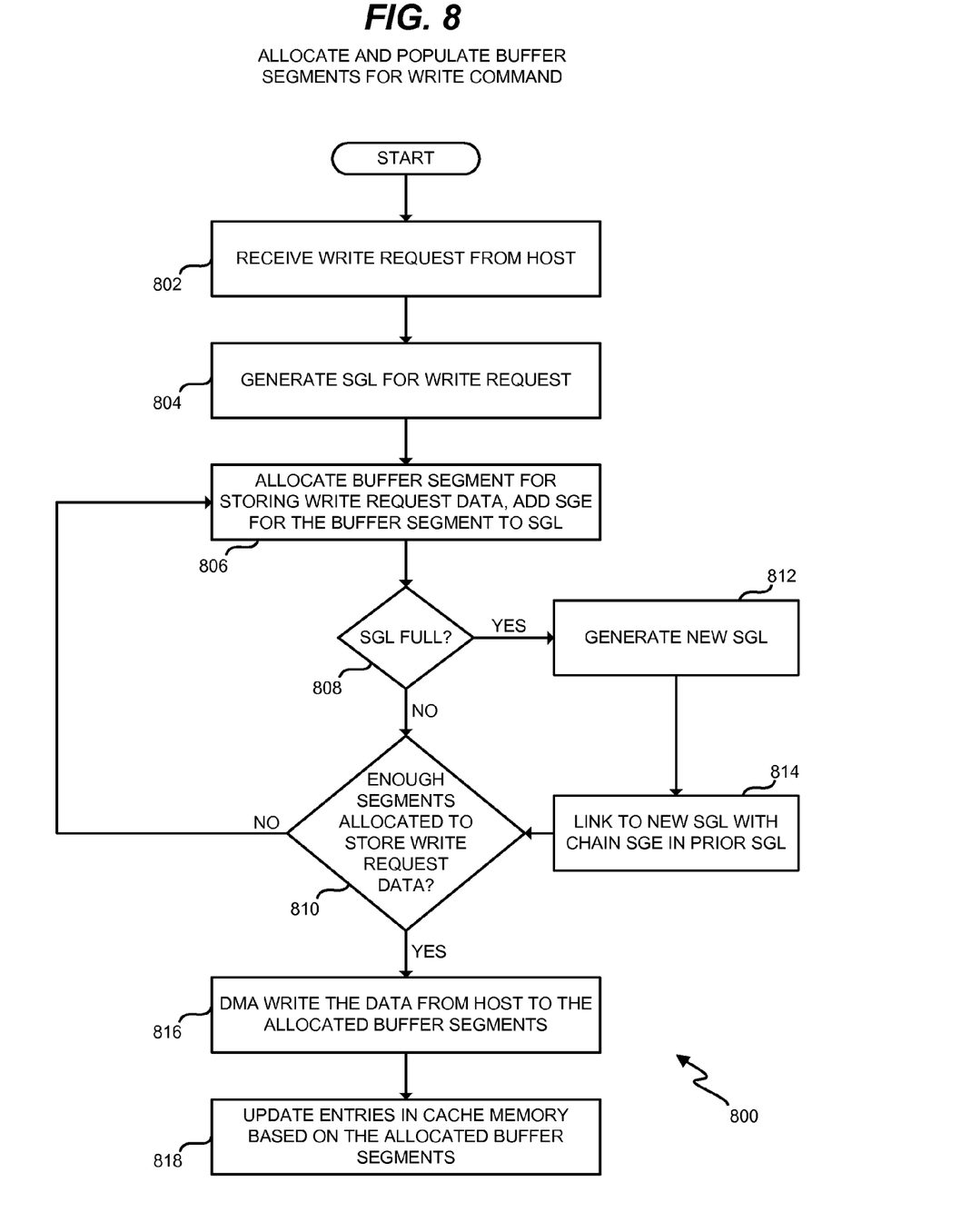
FIG. 8 is a flowchart describing an exemplary method to allocate buffer segments for storing payload data.

FIG. 8 is a flowchart illustrating a method 800 for allocating and populating buffer segments based on an incoming write command. These operations cause data from a host to be written to cache memory at a storage controller. In step 802, the storage controller receives a write request from the host. In step 804, a buffer manager of the storage controller generates an SGL for the write request. In its current form, the SGL is not populated with SGEs, and therefore is empty. The empty SGL will be filled via steps 806-814. In step 806, the buffer manager allocates a new buffer segment for storing payload data from the write request, and adds an SGE to the SGL that points to the allocated buffer segment. In step 808, the buffer manager determines whether or not the SGL is full of SGEs. If the SGL is full, the buffer manager generates a new SGL in step 812, and links to the new SGL by adding a chain SGE to the earlier SGL in step 814. In this manner, SGLs are linked together to form a continuing chain of SGEs. If the SGL is not full in step 808, then the buffer manager determines in step 810 whether or not enough buffer segments have been allocated to store all of the data from the write request. If there is still more data to be stored than there are allocated buffer segments, processing continues back to step 806.

Alternatively, if there are enough allocated buffer segments, then the buffer manager provides the generated SGL(s) to the DMA manager, which utilizes DMA operations to write data from the host to the allocated buffer segments in step 816. Performing a DMA transfer for the buffers segments all at once saves substantial time and processing resources. Once the DMA is done it is further directed to the cache manager. In step 818 the cache manager updates cache entries in cache memory to point to the allocated buffer segments. If the write request updates LBAs that were already stored in the cache memory, then the cache manager updates cache entries to point to new buffer segments generated by the write request, replacing references to buffer segments storing older versions of the data. This does not overwrite the old buffer segments, but it ensures that newly incoming commands directed to the data will reach the newly updated version of that data. After the data is cached, the write request may be reported as completed. The buffer segments may later be flushed from cache memory to persistent storage.

Figure 9:
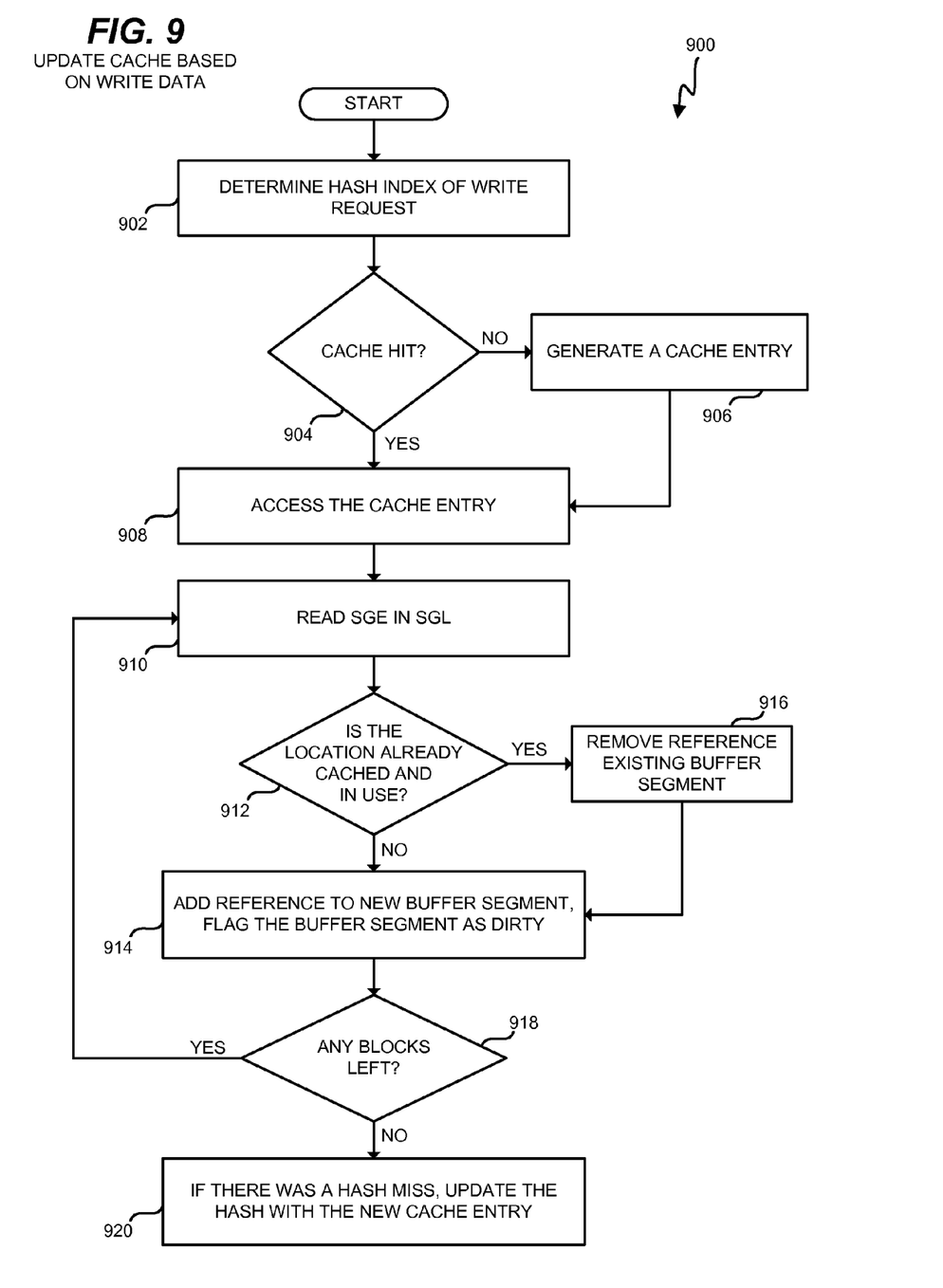
FIG. 9 is a flowchart describing an exemplary method to update a cache based on incoming write data.

FIG. 9 is a flowchart illustrating a method 900 for updating cache entries based on received write data. Method 900 illustrates an exemplary technique for performing step 818 of method 800 above. According to FIG. 9, a cache manager analyzes a received write request, and determines a hash index of the write request in step 902 based on the combination of logical volume and LBA(s) requested. The hash index is used to search a hash table that lists all cache entries. The hash table accelerates the speed at which relevant cache entries are identified. In step 904, the cache manager determines whether the hash index matches any entries in the hash table. If no cache entry matches the hash index, then a cache miss is detected. Hence, in step 906 the cache manager generates a new cache entry for the LBAs referenced by the write data and the new cache entry is accessed in step 908. Alternatively, if a cache entry already exists for the LBAs, then processing continues to step 908 where the identified cache entry is accessed. The cache entry references a number of buffer segments that store data for the requested LBAs. These references will be revised based on the incoming write data.

In step 910, the cache manager reads an SGE from an SGL used in method 800 to populate buffer segments with data. The SGE refers to a buffer segment that stores updated data for an LBA of the write request. The cache manager determines whether an "old" buffer segment for the LBA is referenced in the cache entry and is being read or flushed to persistent storage in step 912. If such an "old" buffer segment exists, then in step 916 all references to the old buffer segment are expunged from the cache entry. This effectively de-indexes the old buffer segment, meaning that future read requests will not access the old buffer segment, even though the old buffer segment is still stored in cache memory (e.g., to complete flushing or prior read requests). Flags for the old buffer segment are copied from the cache entry to a new table in cache memory, in order to ensure that the system can determine when the old buffer segment is no longer in use.

In step 914 a reference the new buffer segment is added to the cache entry, and the reference marks the new buffer segment as dirty because the new buffer segment has not yet been flushed to persistent memory. Processing then continues to step 918 wherein if there are any blocks left from the write command, step 910 is repeated. Once the cache entry has been updated for all blocks, step 920 occurs. In step 920, if there was originally a hash miss in step 904, the cache manager updates the hash table with a new entry for the newly created cache entry.

Figure 10:
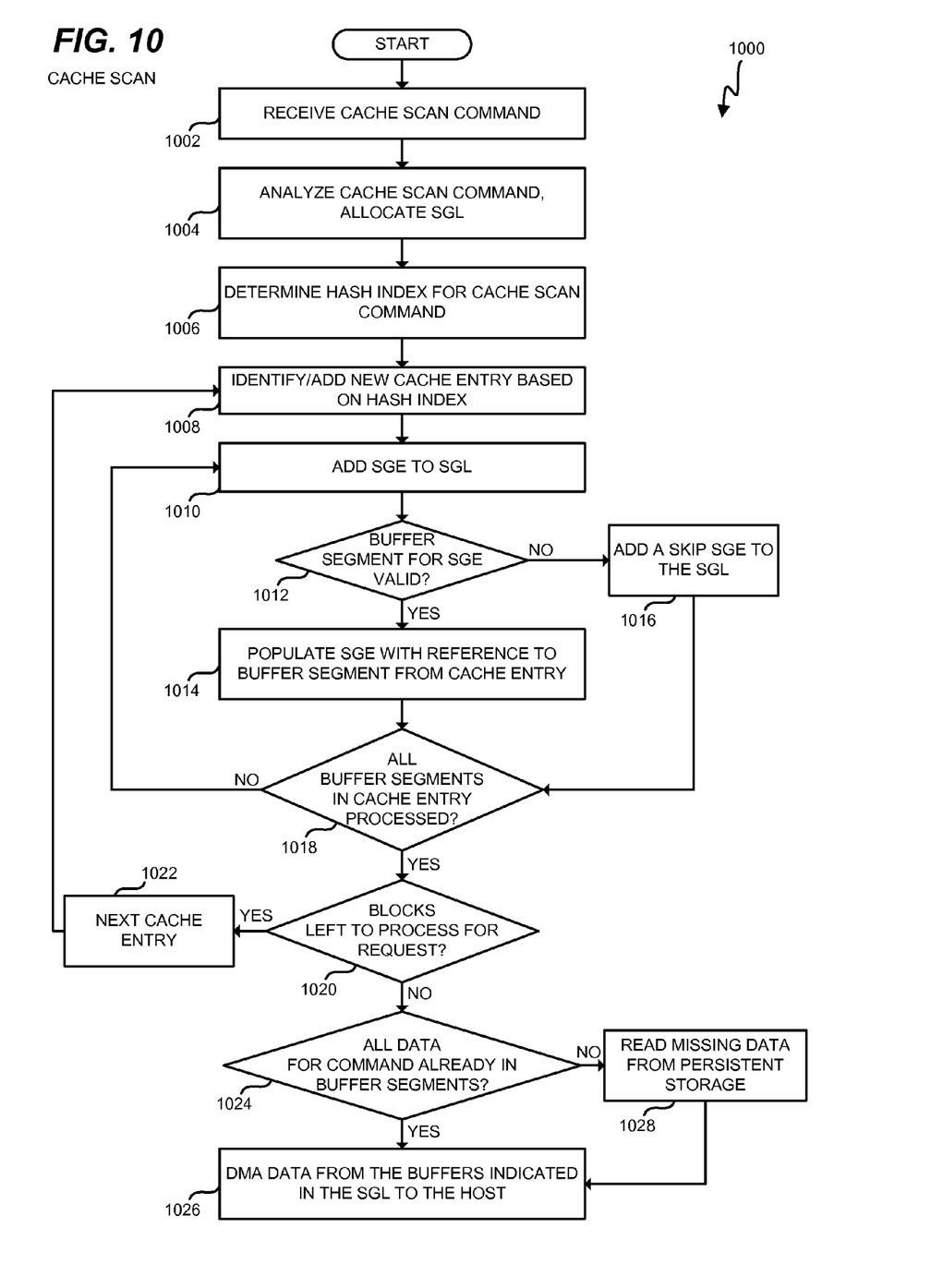
FIG. 10 is a flowchart describing an exemplary method to perform a cache scan.

FIG. 10 is a flowchart illustrating a method 1000 for performing a cache scan on cache memory in a storage controller. A cache scan is implemented, for example, in response to receiving a read request from a host, in order to determine whether data requested by the host is presently stored in cache memory. According to FIG. 10, after a command dispatcher in the storage controller has received a read request from a host, it generates a cache scan command to determine whether data requested by the host is available in cache memory. A cache manager of the storage controller receives the cache scan command in step 1002, and generates an SGL for the cache scan command. At this point in time, the SGL is empty and is not populated with SGEs. In step 1006, a cache manager determines a hash index for the cache scan command, based on the LBAs referenced by the cache scan command. The cache manager then proceeds to step 1008, wherein it detects whether an existing cache entry matches the hash index. If no entry presently matches the hash index, then a cache miss is detected.

The cache manager then begins to populate the SGL with SGEs indicating the location of requested read data. To this end, the cache manager generates a new SGE in the SGL in step 1010. If a buffer segment referenced in the cache entry is valid in step 1012, the cache manager populates the SGE with a reference to the buffer segment in step 1014. Alternatively, if the buffer segment is no longer valid (e.g., because the buffer segment is out of date or is being updated), then processing proceeds from step 1012 to step 1016, where the SGE is prepared as a "skip" SGE, meaning that data will be read from persistent storage instead of the cache memory. Processing continues to step 1018, where the cache manager determines whether or not all buffer segments in the cache entry have been handled. If the cache manager has reached the end of the cache entry, it proceeds to step 1020 to determine whether there are any blocks left to process for the request. If so, the cache manager proceeds to a next cache entry in step 1022. Alternatively, if there are no blocks left to process, the cache manager determines whether all data for the request is already cached in the buffer segments indicated by the SGL in step 1024. If so, the cache manager uses the SGL to direct the operations of a DMA module in transferring the requested data from the cache to the host in step 1026. If not, then in step 1028 the cache manager directs the RAID manager to acquire the missing data from persistent storage, and then proceeds to step 1026 where a DMA operation is performed to transfer data from the buffers to the host. In this manner, data for the read request is retrieved from the cache and used to accelerate the speed at which the request is processed.

Figure 11:
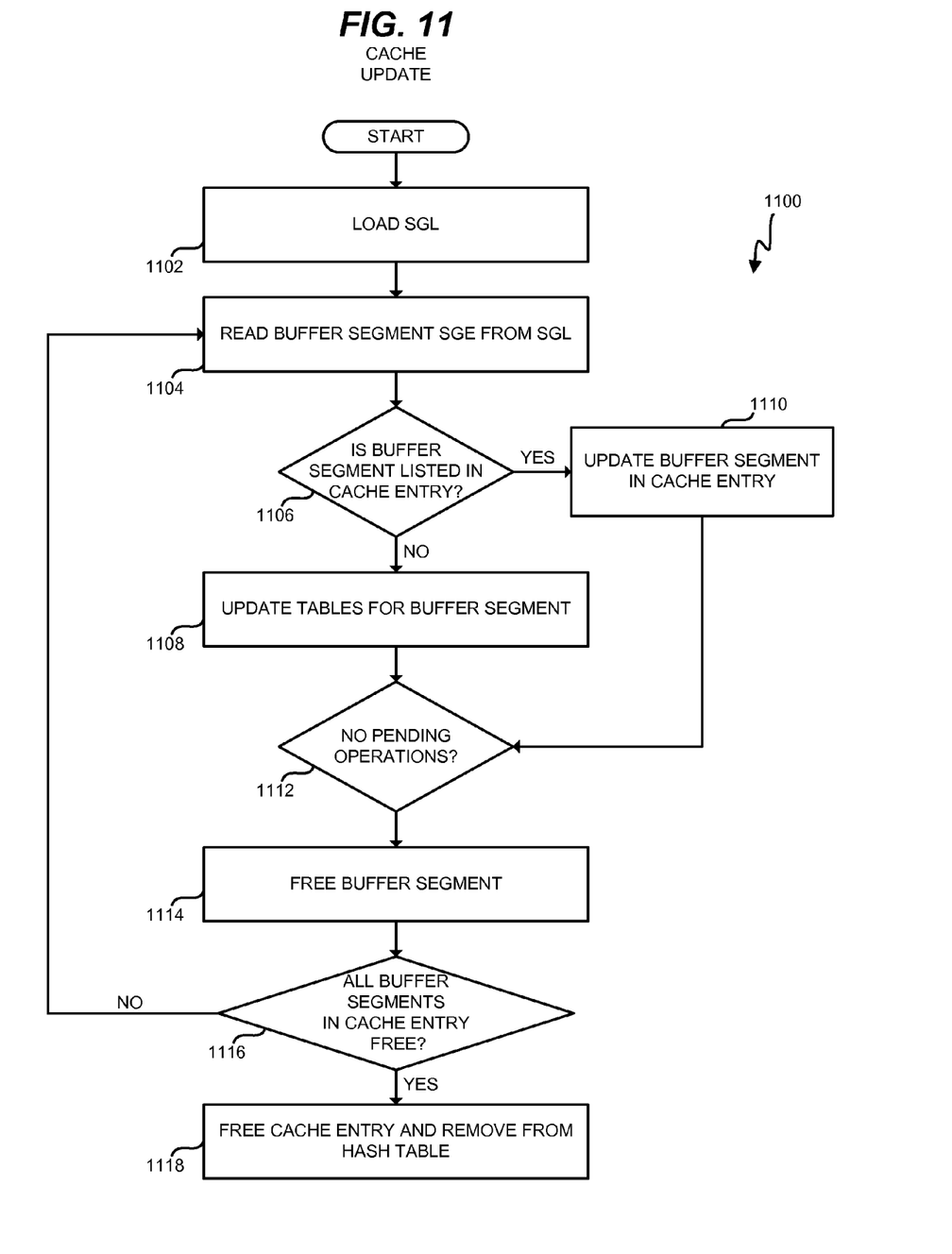
FIG. 11 is a flowchart describing an exemplary method for removing outdated entries from a cache.

FIG. 11 is a flowchart illustrating a method 1100 for removing outdated entries from a cache. For example, method 1100 may be performed after a trigger (e.g., read request or flush operation) occurs. In step 1102, a cache manager loads an SGL into memory that was originally generated for the triggering request, and in step 1104 the cache manager reads an SGE from the SGL that refers to a buffer segment. If the buffer segment referred to by the SGE is still actively listed in a cache entry in step 1106, then tracking data/flags at the cache entry are updated in step 1110. If the trigger was a read request, the read count for the entry is decremented, and if the trigger was a flush operation, a flushing flag for the buffer segment is cleared (e.g., the buffer segment is no longer marked as dirty). Alternatively, if the buffer segment referred to by the SGE is not still listed in a cache entry in step 1106, then in step 1108 flags for the non-indexed buffer segment are updated using the same criteria as in step 1110, and processing continues to step 1112. In step 1112, if the buffer segment does not have any read operations in progress and is not presently flushing (e.g., has already been flushed), then in step 1114 the buffer segment is freed/deallocated by the buffer manager. If all buffer segments for a cache entry are freed in step 1116, then the cache entry itself is deallocated in step 1118 and it is dereferenced from the hash table as well, freeing space for new cache entries.

Figure 12:
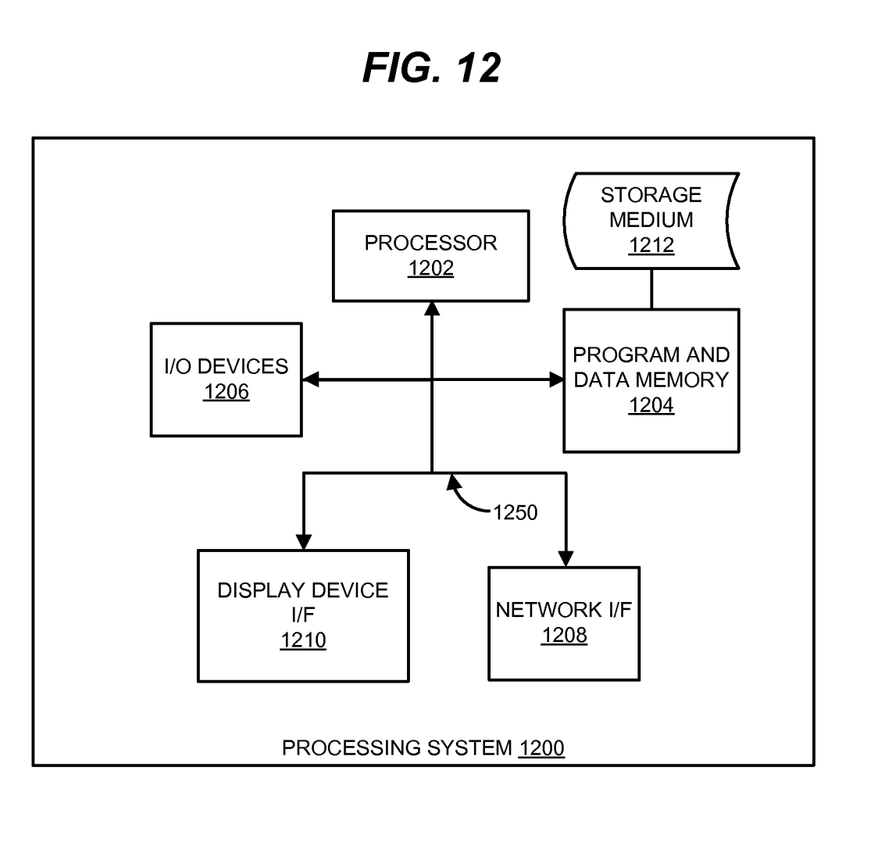
FIG. 12 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of a storage controller to perform the various operations disclosed herein. FIG. 12 illustrates an exemplary processing system 1200 operable to execute a computer readable medium embodying programmed instructions. Processing system 1200 is operable to perform the above operations by executing programmed instructions tangibly embodied on computer readable storage medium 1212. In this regard, embodiments of the invention can take the form of a computer program accessible via computer readable medium 1212 providing program code for use by a computer (e.g., processing system 1200) or any other instruction execution system. For the purposes of this description, computer readable storage medium 1212 can be anything that can contain or store the program for use by the computer (e.g., processing system 1200).

Computer readable storage medium 1212 can be an electronic, magnetic, optical, electromagnetic, infrared, or semiconductor device. Examples of computer readable storage medium 1212 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 1200, being used for storing and/or executing the program code, includes at least one processor 1202 coupled to program and data memory 1204 through a system bus 1250. Program and data memory 1204 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1206 (including but not limited to keyboards, displays, pointing devices, etc.) can be coupled either directly or through intervening I/O controllers. Network adapter interfaces 1208 can also be integrated with the system to enable processing system 1200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1210 can be integrated with the system to interface to one or more display devices, such as printing systems and screens for presentation of data generated by processor 1202.

What is claimed is:

1. A Redundant Array of Independent Disks (RAID) storage controller comprising:
an interface that receives Input/Output (I/O) requests from a host;
a Direct Memory Access (DMA) module;
a memory comprising buffer segments that store data for a logical volume, and further comprising cache entries that correlate buffer segments with Logical Block Addresses (LBAs) of the logical volume; and
a control unit that detects an incoming read request, queries the cache entries to identify buffer segments storing data for the read request, generates a Scatter Gather List (SGL) indicating the identified buffer segments, and directs the DMA module to transfer data to the host based on the SGL,
wherein the control unit further detects an incoming write request that updates LBAs referenced by the read request, updates a cache entry by eliminating a reference to one of the identified buffer segments and adding a new reference to a new buffer segment, and after the cache entry has been updated, prevents the identified buffer segment from being overwritten before the DMA module has finished reading data from the identified buffer segment.

2. The system of claim 1, wherein:
the SGL comprises multiple Scatter Gather Entries (SGEs) that each indicate a buffer segment storing data for the read request.

3. The system of claim 1, wherein:
a cache manager utilizes a hash table to index the cache entries.

4. The system of claim 3, wherein:
entries in the hash table are ordered by a combination of logical volume identifier and strip number for a logical volume.

5. The system of claim 1, wherein:
the control unit generates multiple SGLs for the read request, and links the SGLs together via chain Scatter Gather Entries (SGEs) within the SGLs.

6. The system of claim 1, wherein:
the control unit populates the new buffer segment with data for the incoming write request.

7. The system of claim 1, wherein:
the control unit enables overwriting of the identified buffer segment by deallocating the identified buffer segment.

8. A method for operating a Redundant Array of Independent Disks (RAID) storage controller, the method comprising:
receiving a read request directed to Logical Block Addresses (LBAs) of a logical volume;
querying cache entries in memory that identify buffer segments in the memory which are correlated with the LBAs, wherein the buffer segments store data for the logical volume;
generating a Scatter Gather List (SGL) indicating the identified buffer segments;
directing a Direct Memory Access (DMA) module to transfer data to the host based on the SGL;
detecting an incoming write request that updates LBAs referenced by the read request;
updating a cache entry based on the write request by eliminating a reference to one of the identified buffer segments and adding a reference for a new buffer segment storing the updated LBAs; and
in response to updating the cache entry, preventing the identified buffer segment from being overwritten before the DMA module has finished reading data from the identified buffer segment.

9. The method of claim 8, wherein:
the SGL comprises multiple Scatter Gather Entries (SGEs) that each indicate a buffer segment storing data for the read request.

10. The method of claim 8, further comprising:
utilizing a hash table to index the cache entries.

11. The method of claim 10, wherein:
entries in the hash table are ordered by a combination of logical volume identifier and strip number for a logical volume.

12. The method of claim 8, further comprising:
generating multiple SGLs for the read request; and
linking the SGLs together via chain Scatter Gather Entries (SGEs) within the SGLs.

13. The method of claim 8, further comprising:
populating the new buffer segment with data for the incoming write request.

14. The method of claim 8, further comprising:
enabling overwriting of the identified buffer segment by deallocating the identified buffer segment.

15. A non-transitory computer readable medium embodying programmed instructions which, when executed by a processor, enable the processor to:
receive a read request directed to Logical Block Addresses (LBAs) of a logical volume;
query cache entries in memory that identify buffer segments in the memory which are correlated with the LBAs, wherein the buffer segments store data for the logical volume;
generate a Scatter Gather List (SGL) indicating the identified buffer segments;
direct a Direct Memory Access (DMA) module to transfer data to the host based on the SGL;
detect an incoming write request that updates LBAs referenced by the read request;
update a cache entry based on the write request by eliminating a reference to one of the identified buffer segments and adding a reference for a new buffer segment storing the updated LBAs; and
in response to updating the cache entry, prevent the identified buffer segment from being overwritten before the DMA module has finished reading data from the identified buffer segment.

16. The medium of claim 15, wherein:
the SGL comprises multiple Scatter Gather Entries (SGEs) that each indicate a buffer segment storing data for the read request.

17. The medium of claim 15, wherein the instructions further direct the processor to:
utilize a hash table to index the cache entries.

18. The medium method of claim 17, wherein:
entries in the hash table are ordered by a combination of logical volume identifier and strip number for a logical volume.

19. The medium of claim 15, wherein the instructions further direct the processor to:
generate multiple SGLs for the read request; and
link the SGLs together via chain Scatter Gather Entries (SGEs) within the SGLs.

20. The method of claim 15, wherein the instructions further direct the processor to:
populate the new buffer segment with data for the incoming write request.

* * * * *